Dec. 4, 1928.
W. D. KYLE
1,693,848
CAP FOR GROUND MEMBERS
Filed Oct. 23, 1922
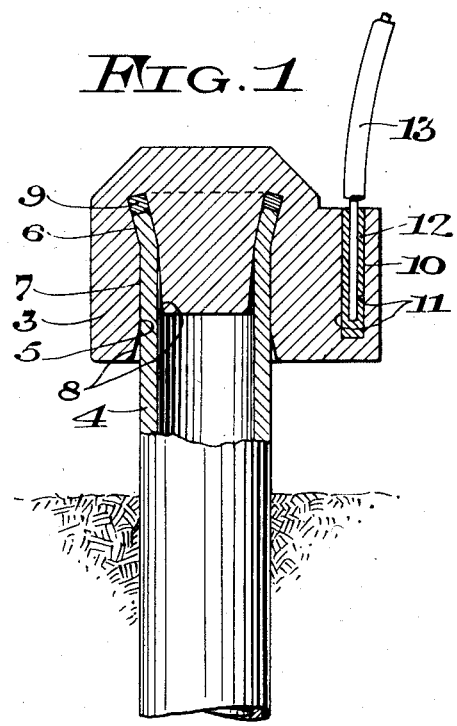
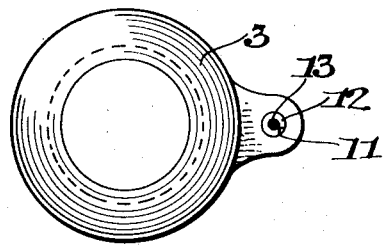
WITNESSES
M. E. Downey
C. L. Naal
INVENTOR
William D. Kyle,
By R. S. Caldwell
ATTORNEY Patented Dec. 4, 1928.

1,693,848

UNITED STATES PATENT OFFICE.

WILLIAM D. KYLE, OF MILWAUKEE, WISCONSIN, ASSIGNOR TO LINE MATERIAL COMPANY, OF SOUTH MILWAUKEE, WISCONSIN, A CORPORATION OF WISCONSIN.

CAP FOR GROUND MEMBERS.

Application filed October 23, 1922. Serial No. 596,531.

The invention relates to a cap for ground-pipe or rod.

According to present practice, it is usual in grounding electric wires to drive a pipe or rod into the ground and saw off the battered upper end of the pipe, place a line connector, such as a wire, around the exposed end of the pipe and solder this to the pipe and the line to be grounded. To obviate these difficulties, I have provided a novel form of cap for the pipe which serves as a driving cap for the upper end of the pipe, is permanently secured thereto during driving and is provided with a recess receiving the grounded wire and which is easily soldered thereto.

The invention further consists in the several features hereinafter set forth and more particularly defined by claims at the conclusion hereof.

In the drawings: Fig. 1 is a vertical sectional view through a device embodying the invention, showing it applied to a ground pipe, and Fig. 2 is a plan view of the device.

In the drawings the numeral 3 designates the cap formed of solid metal, preferably as a casting, provided in case it is to be used for a ground pipe 4 with an annular recess 5 having a flared inner wall portion 6, a straight wall portion 7 and a slightly tapered entrance wall portion 8. In the case of a solid rod, a hole conforming to the outer wall of the annular recess just described is provided, as will be well understood. The pipe or rod is driven into the recess or hole as it is driven into the ground and upsets itself in the flared bottom portion of such recess or hole so that it becomes permanently attached to the cap during driving by a wedge-fit connection. In order to insure a good contact between the ground-member and the cap, I preferably insert a ring 9 of soft metal, such as lead, in the recess or hole prior to driving the cap into said ground-member, and during the driving this lead ring is firmly clamped between the cap and the upper end of the pipe insuring a good contact. The ground-member is hereinafter referred to generally as a ground-rod.

The cap is also provided with a cavity or well 10, the sides 11 of which are tinned before leaving the factory so that the line-man will have no difficulty in soldering the line wire thereto. This cavity with its tinned sides may also be filled with solder 12 so that the lineman, by use of a blow-torch, may heat up this solder and then simply dip the bare end of the wire 13, to be grounded, in the molten solder to form the connection with the cap. The solder well is formed in a fin or rib projecting from the main body of the cap, the rib presenting a relatively large surface on a small volume of metal, in order to facilitate the heating of the solder. This disposition of the solder well also places it at a sufficient distance from the impact face to avoid being battered closed when driving the rod, and to further avoid such possibility, the well preferably opens at a plane below the level of the impact face.

What I claim as my invention is:

1. A driving cap for a ground-rod, having a recess tightly receiving the upper end of the rod and an upper impact face above the recess, said cap having a laterally extending projection containing a ground-wire-receiving solder well opening at its upper end on a plane below the level of said impact face.

2. The combination with a ground-pipe, of a driving cap therefor having an annular recess to receive the end of said pipe, said annular recess having its inner end flared outwardly to wedgingly flare the end of said pipe when driven therein by driving impact on said cap and to afford a scraping action under the radial pressure developed during flaring, and means for connecting a ground wire to the cap.

3. A grounding device comprising a ground-rod, a cap having an upper impact face and having a downwardly-opening recess tightly receiving the upper end of said rod for communicating driving blows to said rod and to form an electrical connection between said cap and said rod, and said cap having at one side an integrally-formed laterally-projecting upright rib containing between its opposite sides a ground-wire-receiving solder well opening in the upper edge of said rib.

4. A grounding device comprising a ground-rod, a cap having a downwardly-opening recess receiving the upper end of said rod, means within said recess entering the upper end of said rod, for wedgingly flaring the rod thereon by and during driving to effect a fixed connection between said rod and said cap, and means for connecting a ground wire to said cap.

5. A grounding device comprising a ground-rod, a cap having a downwardly-opening recess into which the upper end of said rod is received, means within said recess entering the upper end of said ground-rod to wedgingly flare the upper end portions of said rod as the cap is driven thereon, a deformable metal insert interposed between the upper end of said recess and said rod and compressed by the driving operation into firm contact with said cap and rod to insure good electrical connection therebetween, and means for connecting a ground wire to said cap.

6. A grounding device comprising a ground-rod, a cap including a downwardly-opening recess receiving the upper end of said rod, means within said recess entering the upper end of said rod for wedgingly flaring the upper end portions of said rod thereon as the cap is driven thereon to fixedly secure the cap to the rod in electrical connection therewith, the lower portions of said recess including walls for guiding the portions of the rod entering the recess and the upper portions of said recess adjacent said rod-flaring means being enlarged to receive the flared portion of said rod, and means for connecting a ground wire to said cap.

In testimony whereof, I affix my signature.

WILLIAM D. KYLE.